April 17, 1956   A. A. HOPEMAN, JR., ET AL   2,741,779
FOLDING BERTH CONSTRUCTION
Filed July 11, 1950   13 Sheets-Sheet 1
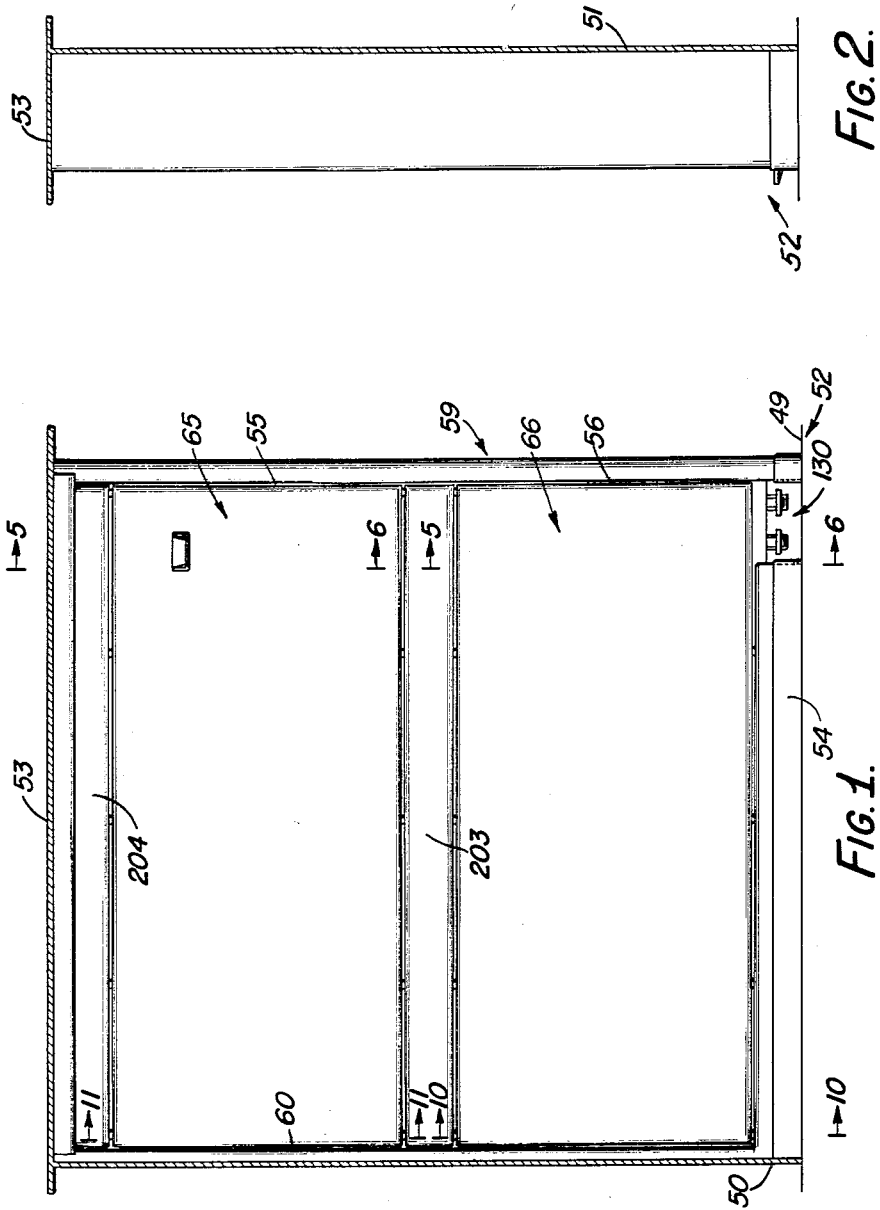
INVENTOR.
ALBERT A. HOPEMAN JR.
AND JOHN A. BOHNSACK
BY
THEIR ATTORNEY

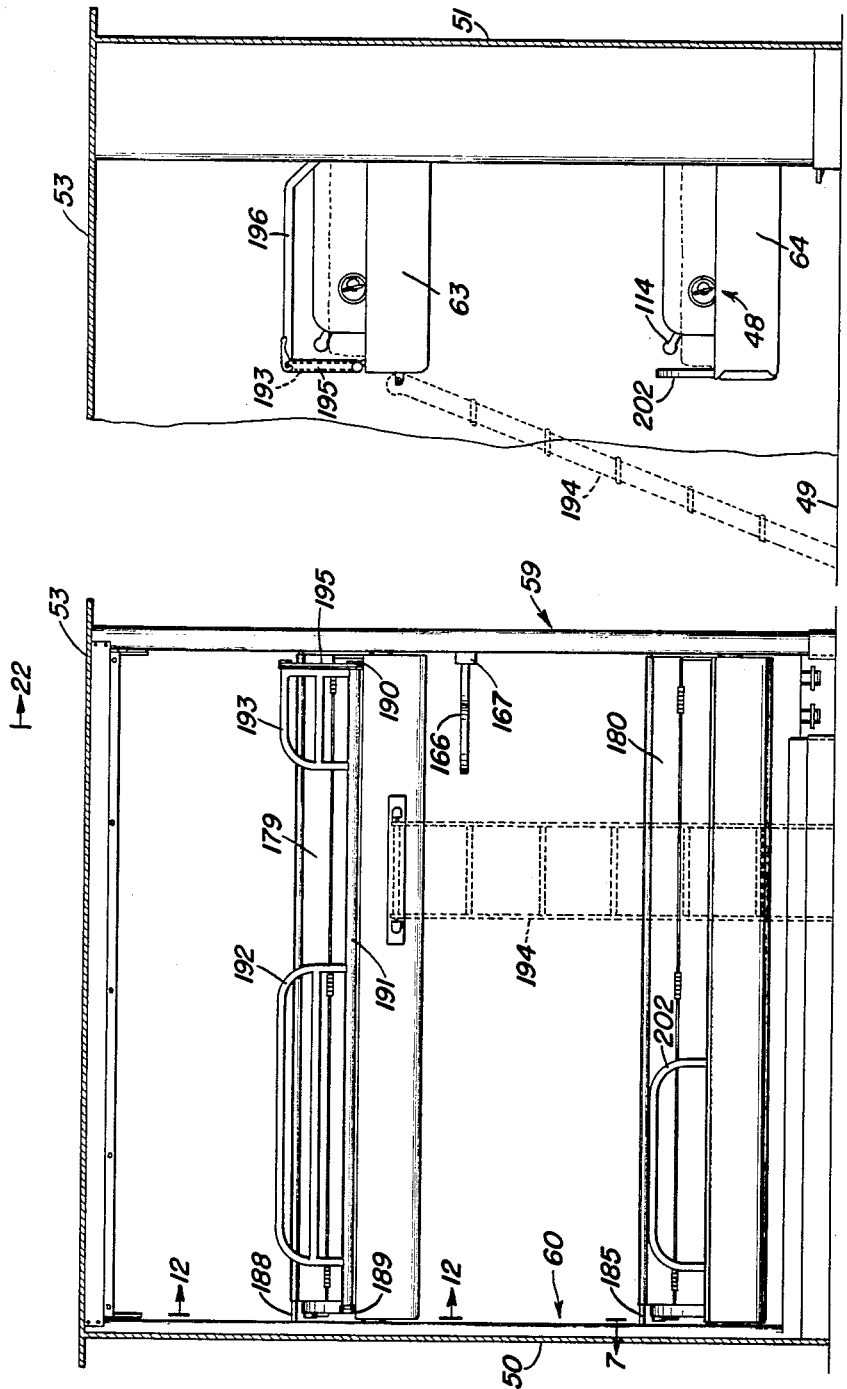

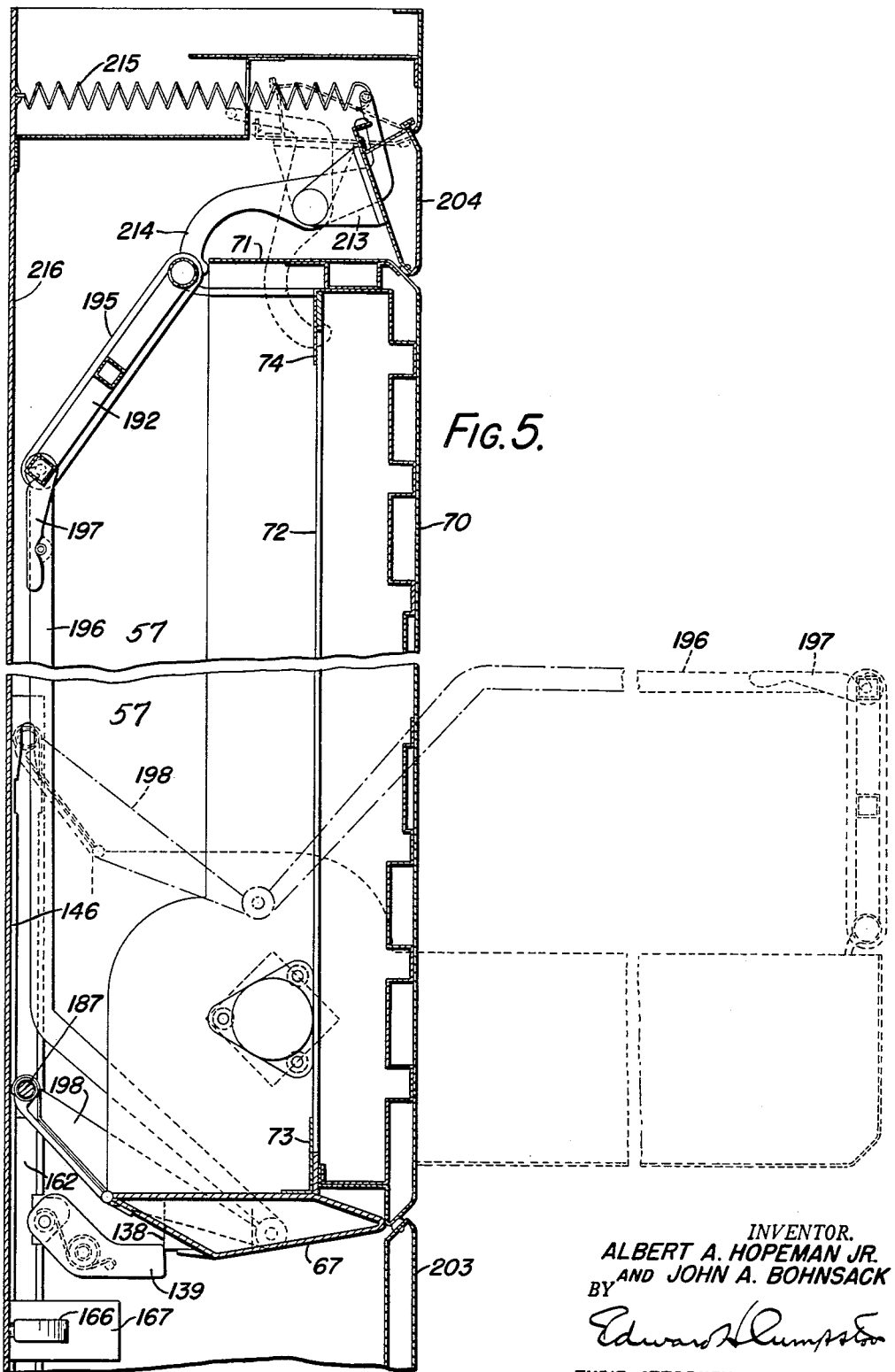

April 17, 1956     A. A. HOPEMAN, JR., ET AL     2,741,779
FOLDING BERTH CONSTRUCTION
Filed July 11, 1950     13 Sheets-Sheet 4

INVENTOR.
ALBERT A. HOPEMAN JR.
BY AND JOHN A. BOHNSACK

THEIR ATTORNEY

April 17, 1956    A. A. HOPEMAN, JR., ET AL    2,741,779
FOLDING BERTH CONSTRUCTION Filed July 11, 1950    13 Sheets-Sheet 5

INVENTOR.
ALBERT A. HOPEMAN JR.
BY AND JOHN A. BOHNSACK

Edward H. Dumpster
THEIR ATTORNEY

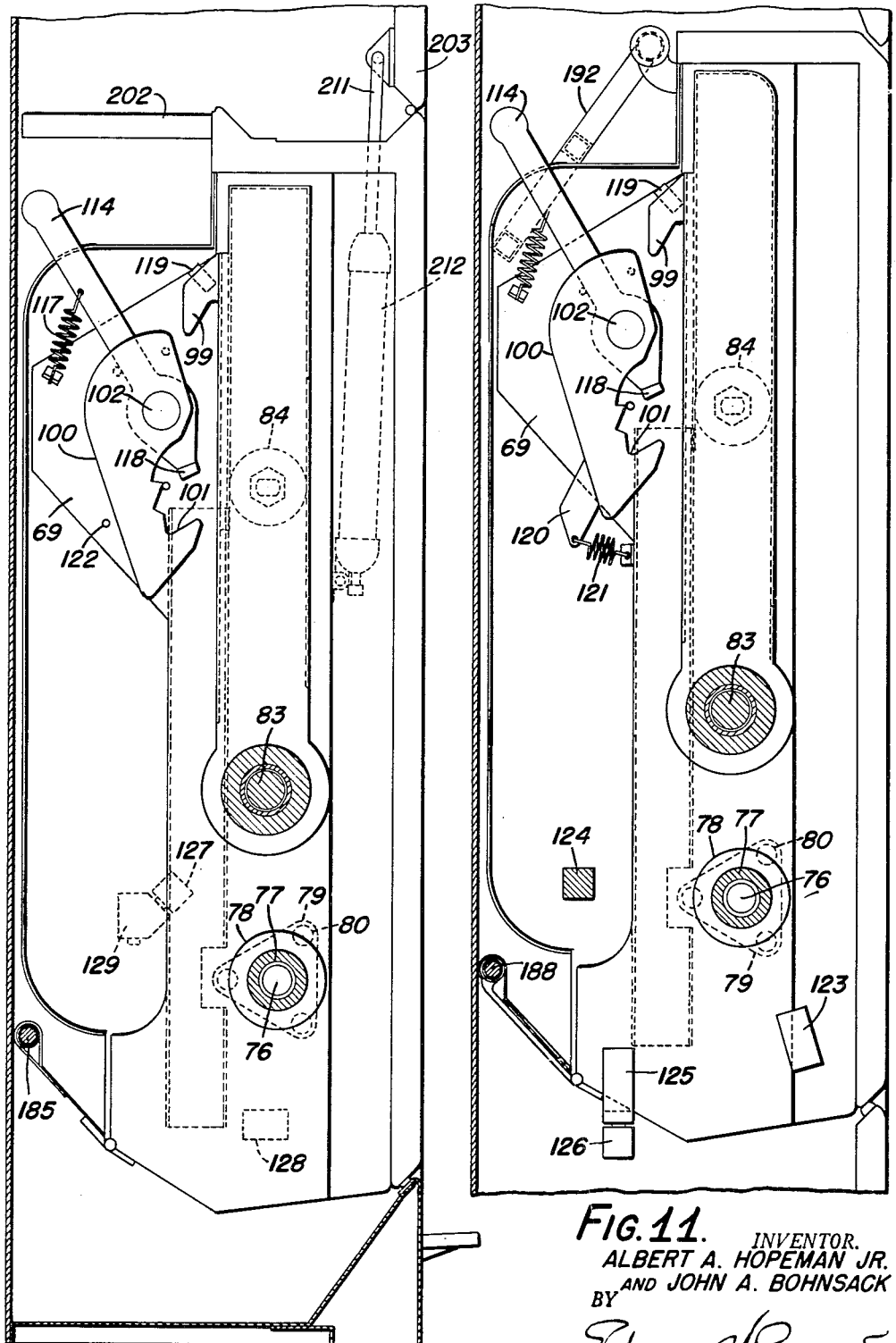

April 17, 1956    A. A. HOPEMAN, JR., ET AL    2,741,779
FOLDING BERTH CONSTRUCTION
Filed July 11, 1950    13 Sheets-Sheet 7
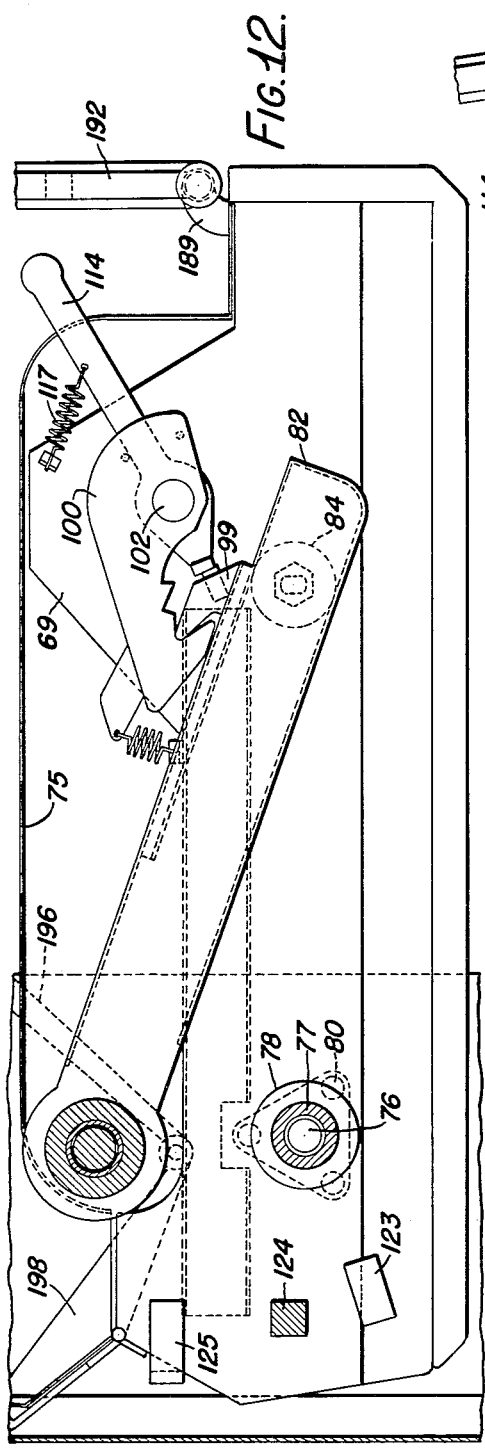
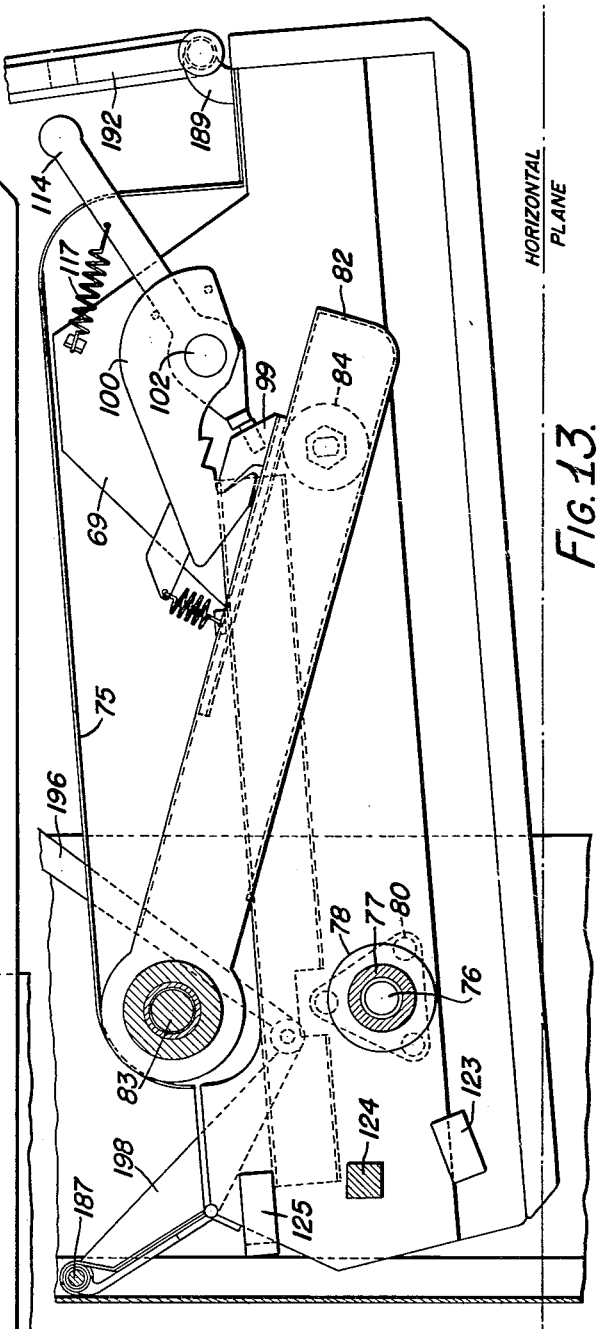
INVENTOR.
ALBERT A. HOPEMAN JR.
BY AND JOHN A. BOHNSACK
THEIR ATTORNEY

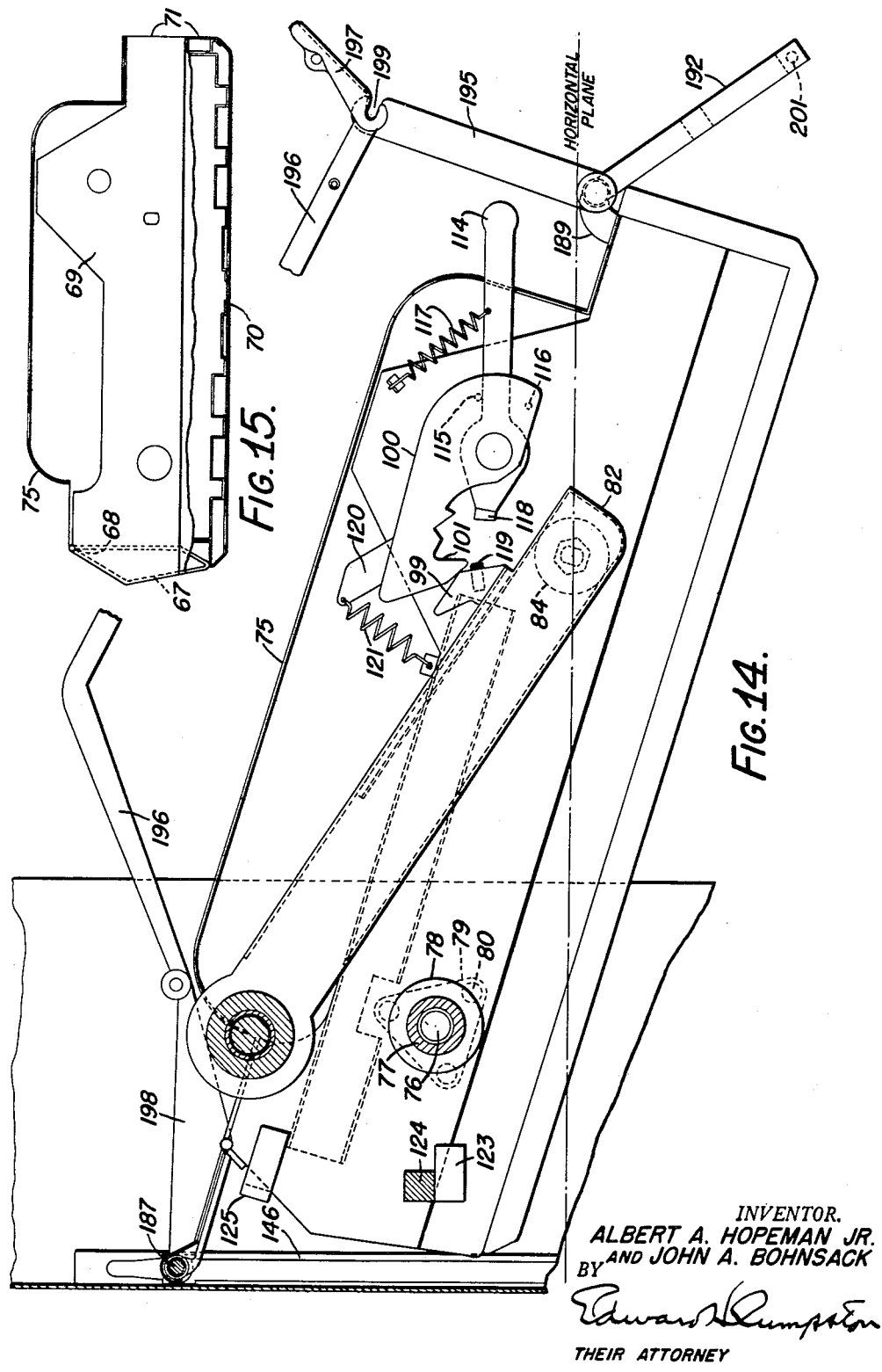

April 17, 1956  A. A. HOPEMAN, JR., ET AL  2,741,779
FOLDING BERTH CONSTRUCTION

Filed July 11, 1950  13 Sheets-Sheet 9

INVENTOR.
ALBERT A. HOPEMAN JR.
AND JOHN A. BOHNSACK
BY

THEIR ATTORNEY

April 17, 1956   A. A. HOPEMAN, JR., ET AL   2,741,779
FOLDING BERTH CONSTRUCTION Filed July 11, 1950   13 Sheets-Sheet 10

INVENTOR.
ALBERT A. HOPEMAN JR.
AND JOHN A. BOHNSACK
BY

THEIR ATTORNEY

April 17, 1956    A. A. HOPEMAN, JR., ET AL    2,741,779
FOLDING BERTH CONSTRUCTION
Filed July 11, 1950    13 Sheets-Sheet 11

INVENTOR.
ALBERT A. HOPEMAN JR.
AND JOHN A. BOHNSACK
BY
Edward L. Crumpton
THEIR ATTORNEY

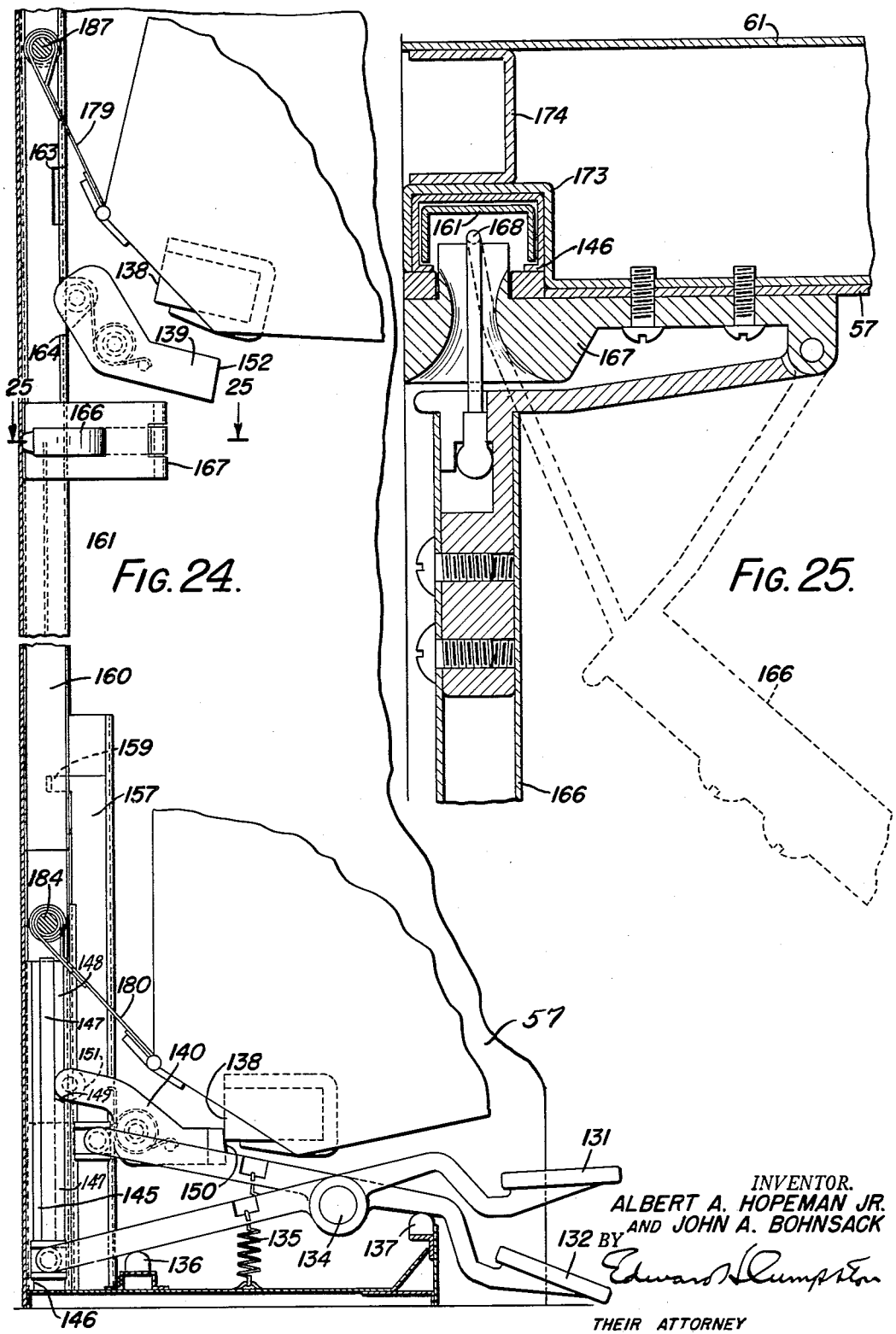

April 17, 1956  A. A. HOPEMAN, JR., ET AL  2,741,779
FOLDING BERTH CONSTRUCTION
Filed July 11, 1950  13 Sheets-Sheet 13
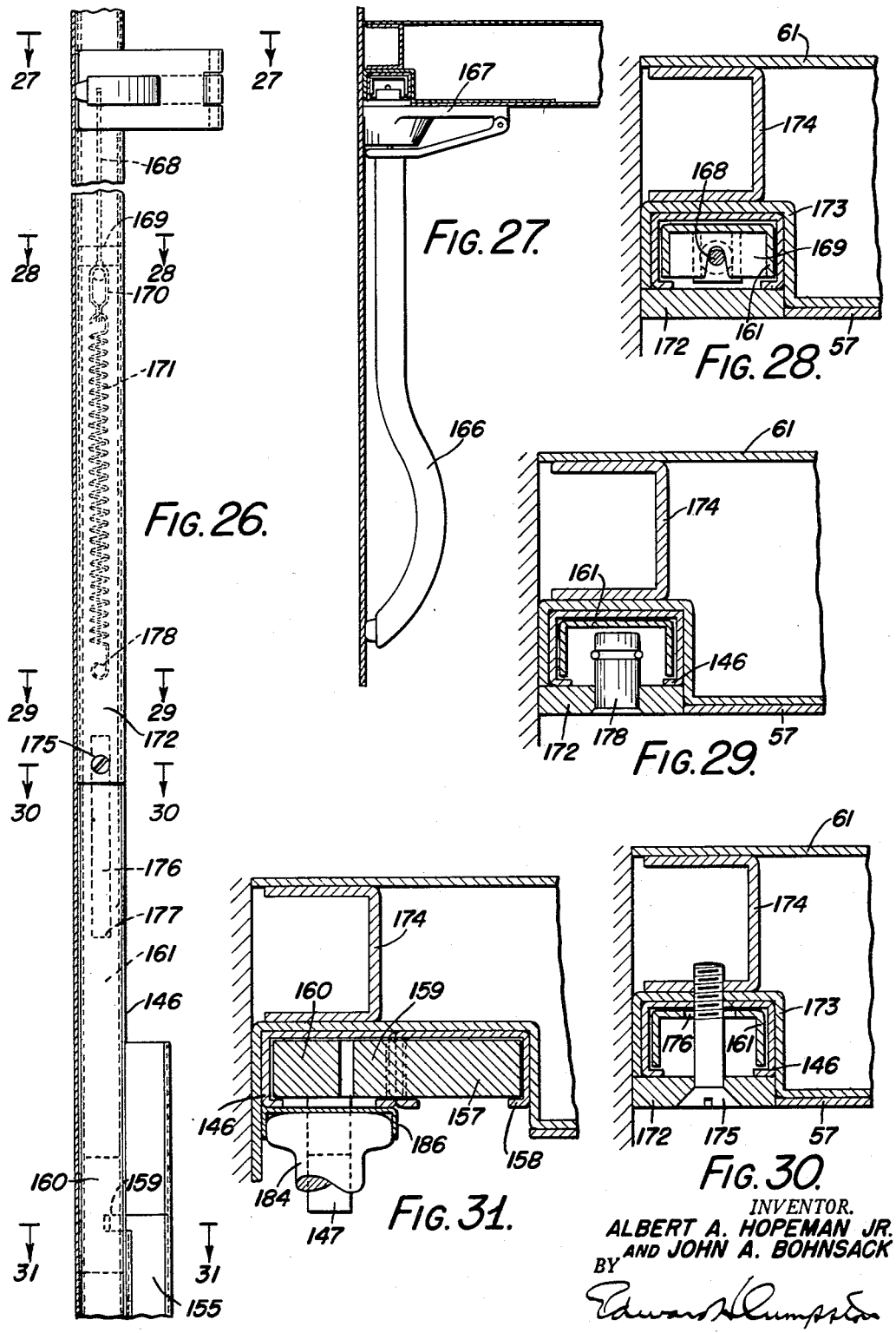
INVENTOR.
ALBERT A. HOPEMAN JR.
AND JOHN A. BOHNSACK
BY
THEIR ATTORNEY

# United States Patent Office 2,741,779
Patented Apr. 17, 1956

2,741,779

FOLDING BERTH CONSTRUCTION

Albert A. Hopeman, Jr., Bronxville, N. Y., and John A. Bohnsack, Waynesboro, Va., assignors to Hopeman Bros., Inc., New York, N. Y., a corporation of Delaware Application July 11, 1950, Serial No. 173,092

26 Claims. (Cl. 5—9)

This invention relates to folding berths, and more particularly, to the variety adapted for use in ship staterooms, railway Pullmans and other locations where the available space is restricted or its conservation is desired, one object of the invention being to provide an improved folding berth of the above character having a more practical, safe and convenient character of construction.

Folding berths are known in which the berths are supported for movement from a folded position to an extended position of use by lever means, crank and screw means, and the like. In general, however, such known constructions have been difficult for an unskilled person to manipulate, or laborious in operation, or required the exertion of considerable force, or were otherwise inconvenient and another object of the present invention, therefore, is to provide a berth construction in which the berth may be quickly and easily moved from a folded to an extended position, or conversely, by an unskilled person of ordinary strength.

Another object is to provide a folding berth which may be easily and securely locked in an extended position of use in a substantially horizontal plane, and which if desired, may be locked in a second extended position of use having its outer edge somewhat elevated so as to reduce the possibility of an occupant being thrown out of the berth during swaying or rolling movement of the railway car or ship. In other words, the outer edge of the berth may be tilted upwardly so as to tend to hold the occupant near the inner edge thereof.

Another object is to provide a folding berth having an improved berth pan construction capable of being supported in an extended position of use by supporting means located at one end thereof and of rigidly resisting any weights or stresses to which it may be subjected in normal use.

Another object is to provide a folding berth with a guard rail having improved automatic means for raising the rail in the open position of the berth and for collapsing it when the berth is moved to folded position.

Another object is to provide a wall berth having a casing with a berth receiving opening and a berth having improved auxiliary means for automatically completing the closure of the casing opening when the berth is moved to closed position.

Another object is to provide a folding berth with practical and conveniently adjustable means for supporting it in position with its outer side partially lowered to facilitate the making up of the berth in preparation for occupancy.

Another object is to provide an improved double wall berth construction comprising upper and lower berths with convenient means for operating either berth while the other is extended in position for use.

A further object is the provision of folding berths having the above advantages in a simple, practical and convenient type of construction capable of being readily and easily manufactured and of being conveniently operated in use by an unskilled person.

To these and other ends the invention resides in certain improvements and combinations of parts, all as will be hereinafter more fully described, the novel features being pointed out in the claims at the end of the specification.

In the drawings:

Fig. 1 is a front elevation view of upper and lower berth equipment embodying the present invention and showing the berths in the folded position;

Fig. 2 is an end elevation showing the berths in folded position;

Fig. 3 is a view similar to Fig. 1 but showing the berths in the normal extended position of use;

Fig. 4 is a view similar to Fig. 2 but showing the berths in the normal extended position of use;

Fig. 5 is a sectional elevation substantially on the line 5—5 in Fig. 1, showing the upper berth, the means for raising the guard rail and the means for operating the upper closure flap, the berth being shown in raised and lowered positions in full and broken lines, respectively;

Fig. 10 is an enlarged sectional elevation view of the lower berth substantially on the line 10—10 in Fig. 1, partly in section, showing the berth supporting means and latching means;

Fig. 11 is a similar view of the upper berth as seen from line 11—11 in Fig. 1;

Fig. 12 is an enlarged sectional elevation of the upper berth substantially on line 12—12 in Fig. 3, partly in section showing the berth supporting means and latching means in position for locking the berth in the normal extended position of use;

Fig. 13 is a similar view, but showing the berth in the tilted position for use in rough weather;

Fig. 14 is a view similar to Fig. 12, but showing the berth in the downwardly inclined position and with the guard rail means swung out of the way to permit easy access to the berth;

Fig. 15 is an end view, similar to Fig. 12, but with parts removed and broken away, and showing the berth pan construction;

Fig. 22 is a sectional elevation substantially along line 22—22 in Fig. 3, partly in section and partly broken away, showing the pedal operated latching means holding the upper berth in the closed position, the lower berth being in the released position;

Fig. 23 is a sectional plan view substantially on line 23—23 in Fig. 22, showing the pedal means;

Fig. 24 is a view similar to Fig. 22, but showing the upper berth in the released position and the lower berth latched in the closed position;

Fig. 25 is a sectional plan view substantially on line 25—25 in Fig. 24, showing the hand operated auxiliary release in the standby and operative positions, as shown by full and broken lines, respectively;

Fig. 26 is an enlarged fragmentary section of the upper berth latch releasing mechanism as shown in Fig. 22, showing the auxiliary release operating means;

Fig. 27 is a sectional plan view substantially on line 27—27 in Fig. 26, showing the channel members comprising the latch operating means;

Fig. 28 is a view similar to Fig. 27 on line 28—28 in Fig. 26;

Fig. 29 is a similar view substantially on line 29—29 in Fig. 26;

Fig. 30 is a similar view substantially on line 30—30 of Fig. 26, and

Fig. 31 is a similar view substantially on line 31—31 in Fig. 26, showing the interconnection between the lower bar members of the upper berth latch releasing means.

Figure 6:
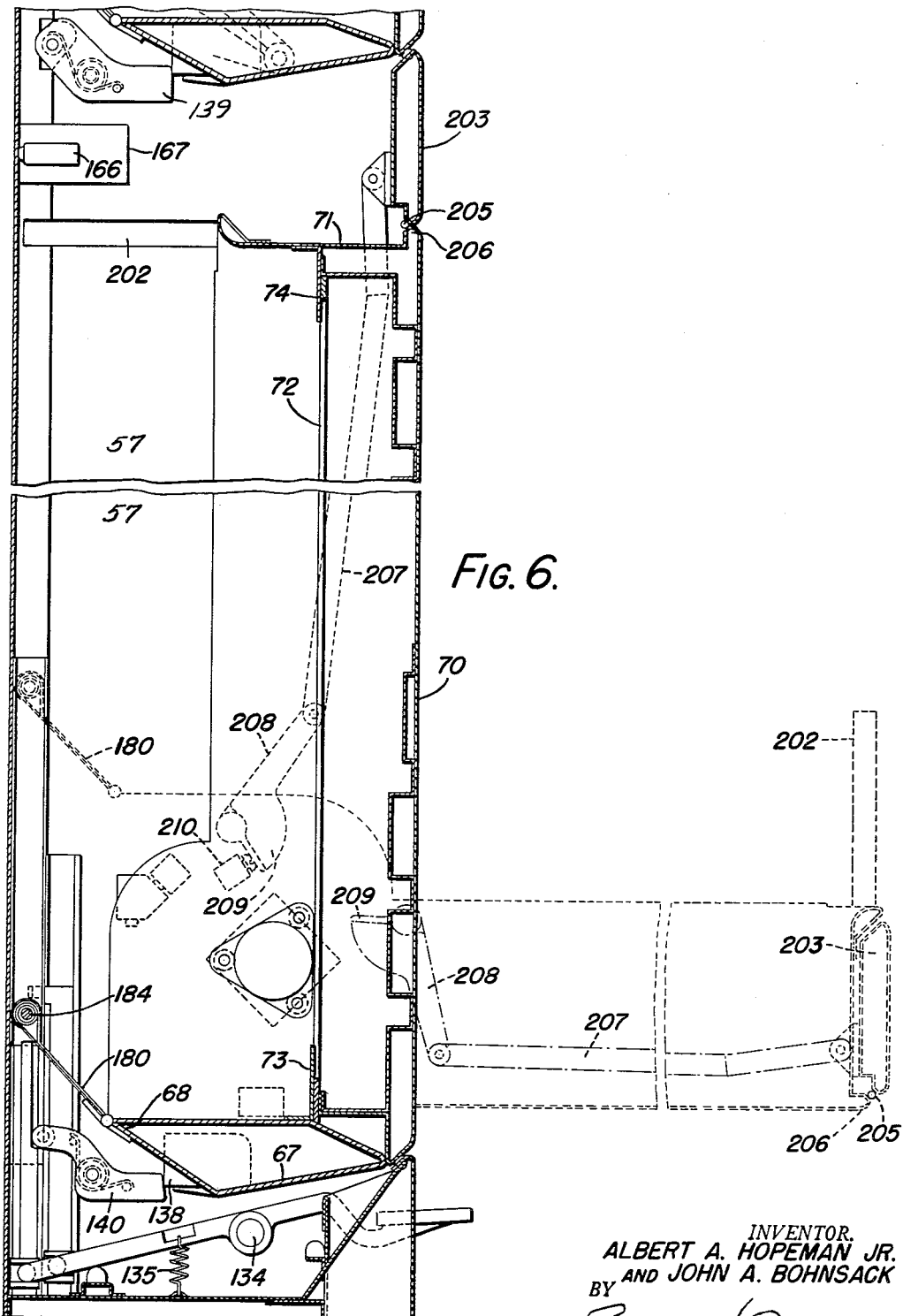
Fig. 6 is a sectional elevation substantially on the line 6—6 on Fig. 1, showing the lower berth latching means and the link means operating the lower closure flap, the berth being shown in raised and lowered positions in full and broken lines, respectively.

The invention is embodied in the present instance, by way of illustration, in unitary upper and lower berth equipment (Figs. 1 and 2) shown on the deck 49 of a ship against bulkheads 50 and 51 thereof at their intersection. This berth equipment comprises frame and casing means indicated generally at 52 (Figs. 1 and 2) of generally rectangular compact shape extending from the deck vertically through any suitable connection with the upper ceiling or deck 53. The front side 54 (Fig. 1) of the casing is formed with upper and lower berth receiving openings 55 and 56, respectively, which are closed by the bottoms of the berth pans and associated parts when the berths are in their upwardly folded positions, as hereafter described.

The supporting frame and casing means comprises opposite inner end walls 57 (Figs. 23 and 30) and 58 (Fig. 8) of metal plates of substantial thickness and strength to provide the main support for the equipment. End walls 57 and 58 are formed with a substantially U-shaped cross section providing hollow rectangular supporting columns as shown generally at 59 and 60 (Fig. 3), respectively, having outer walls 61 (Figs. 23 and 25) and 62 (Figs. 7–9), respectively. It is contemplated that one column be adapted for direct connection to a bulkhead as for example column 60 (Figs. 1 and 3). Columns 59 and 60 are provided with levelling means, not shown, as well understood in the art, for adapting the berth for use on a cambered deck or floor.

The upper and lower berths 63 and 64, respectively (Fig. 4) are adapted to be pivotally supported on inner casing walls 57 and 58 by means to be hereinafter described. Each of the upper and lower berths comprises substantially a rectangular sheet metal berth pan shown generally at 65 and 66 (Fig. 1), respectively, of generally similar construction, except as hereafter noted, so that a description of one will apply to both. Referring to the upper berth (Fig. 15), the berth comprises a hollow one-piece torque tube 67, preferably of sheet steel of substantial thickness and strength, the free edges of which are welded together as at 68 (Fig. 6), forming a rigid support having a high resistance to twisting and bending stresses. The tube extends longitudinally along the inside edge of the berth (considering the berth in an extended position of use, Fig. 15) and has fastened to either end thereof, preferably by welding, end plates or arms 69 (Fig. 15) preferably of steel plate of substantial thickness and strength. To this rigid frame a relatively lightweight, rib-stiffened berth pan is fixed, comprising a bottom 70 and front wall 71, attached to the said frame, preferably by welded connections, as shown in Figs. 5 and 15.

Each arm 69 has attached to the inner side thereof above the pan bottom a shelf-like plate 72 which is also securely fastened at the inner end thereof to torque tube 67 (Fig. 6). The inner ends of said plates 72 are connected by an L-shaped longitudinally extending brace-plate 73 which in turn is also secured to torque tube 67. A similar longitudinally extending brace-plate 74 (Fig. 5) connects the outer ends of plates 72. The head end of the berth has a cover plate 75 fixed on the inner side thereof which not only provides a neat and attractive appearance but also prevents bedding and the like from being entangled by the berth latching mechanism, to be hereafter described. Plates 72 are provided with means for anchoring the ends of the usual spring straps (not shown) which serve with the plates to support the mattress and bedding.

Figure 8:
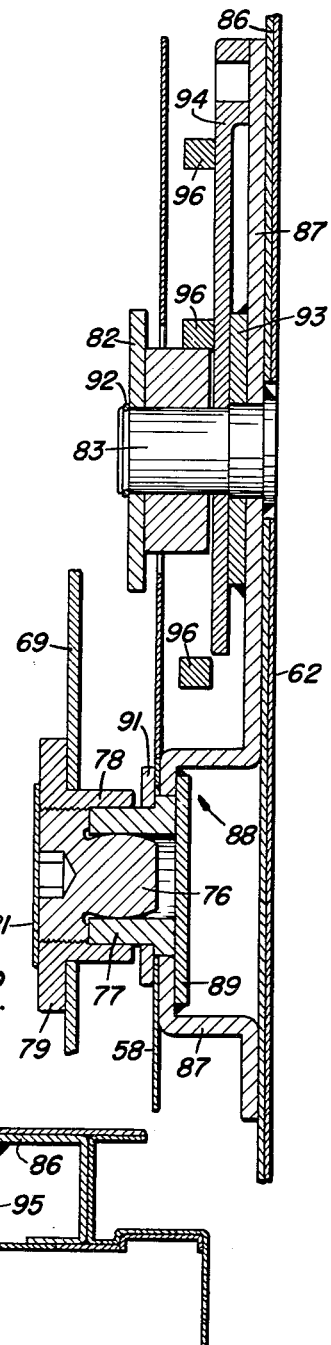
Fig. 8 is an enlarged fragmentary sectional view substantially on the line 8—8 in Fig. 7, partly in section and partly broken away, to better illustrate the counterbalancing and berth pivot means.

The pivotal mounting at each end of each berth is identical and preferably comprises a trunnion 76 (Fig. 8) extending outwardly through an opening in the end plate for engagement with a bearing 77 attached to the respective inner casing wall (Fig. 8). Said trunnion 76 is threadedly secured to a cylindrical collar 78 which has a triangular shaped flange 79 on the inner end thereof secured to the berth end plate by screws 80 (Fig. 11). A circular cap 81 (Fig. 8) covers the inner end of said flanges. End walls 57 and 58 have strengthening and reinforcing means, to be hereinafter described, securely attached thereto adjacent bearings 77.

Each berth is provided with means for restricting and limiting its pivotal movement (Figs. 11, 16, 17 and 19) comprising a single supporting arm 82 one end of which is pivotally mounted on a trunnion 83 attached to inner casing wall 58 at a point above and slightly to the rear of bearing 77 (Fig. 11). Said arm has a C-shaped cross section (Fig. 18) and slidably engages a roller 84 secured to the head end berth plate 69 by a bolt 85 and is provided with counterbalancing and adjustable latching means, to be hereafter described. It is to be noted that because of the above rigid berth pan structure, it is necessary to locate the above supporting arm and its cooperating counterbalancing and latching mechanisms at one end only of the berth, which not only reduces the weight and cost of construction, but also makes for easier and more convenient operation. In the present instance the supporting arm and cooperating mechanism is shown located on the left or bulkhead end of the casing (Figs. 1 and 3).

Figure 9:
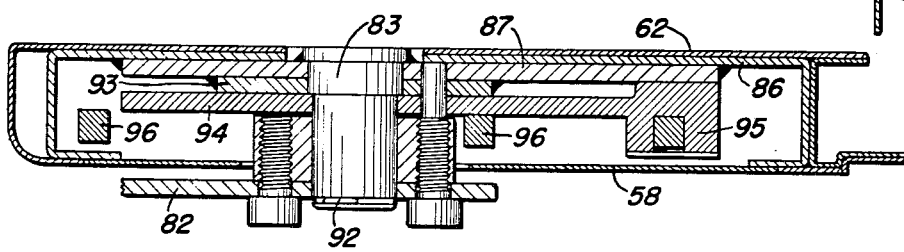
Fig. 9 is a sectional plan view substantially on line 9—9 in Fig. 7, showing the casing reinforcing and supporting arm pivot construction.

End column 60, which has attached thereto the berth supporting means, is strengthened by a C-shaped channel 86 extending substantially the full width of the column and for a suitable distance vertically (Fig. 9). The bottom of the channel is contiguous with the inner side of the column wall and in turn has securely attached to the inner side thereof a second reinforcing plate 87. Plate 87 has a portion thereof raised inwardly as shown generally at 88 (Fig. 8) for contacting inner wall 58 and forming a supporting surface for the inner end of bearing 77 which supports trunnion 76. Bearing 77, preferably cylindrical in shape, has on the inner end thereof a transversely extending flange 89, which is securely held by screw means 90 (Fig. 7) to plate 87 and to a retaining collar 91 which fits over bearing 77 and lies adjacent the opposite side of inner end wall 58.

Opposite end wall 57 has similar bearings 77 attached thereto for supporting the opposite end of the berth. Column 59 is reinforced by suitable channel and plate means, not shown.

The supporting arm and the means for restricting the pivotal movement of each berth are generally similar, except as hereafter noted, so that a description of one will aply to both. Supporting arm 82 (Fig. 8) is pivotally mounted on shaft or trunnion 83 which in turn is secured to outer column wall 62 and reinforcing plates 86 and 87. A retaining pin 92 prevents arm 82 from slipping off shaft 83. Arm 82 is spaced along said shaft by spacing collar 93 and a plate 94, which is adapted for limited pivotal movement about said shaft. Plate 94 has attached near the periphery thereof a block 95 for securing one end of a heavy counterbalancing spring 96 to said plate, the other end of said spring being attached adjacent the inner end of arm 82 (Fig. 7).

Figure 7:
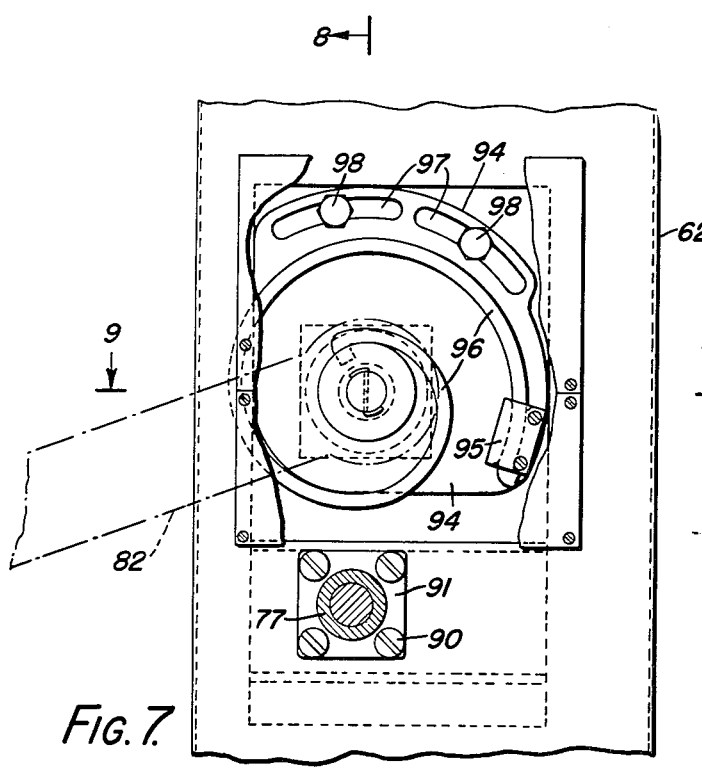
Fig. 7 is a sectional elevation substantially on the line 7—7 in Fig. 3, showing the counterbalancing spring and tension adjusting means therefor.

Spring 96 moves arm 82 in a counterclockwise direction as seen in Figs. 11 and 12, clockwise direction as seen in Fig. 7 and is of sufficient strength and is under sufficient tension to substantially counterbalance the weight of the berth pan and associated parts. As the berth moves to an extended position of use, the rotation of arm 82 increases the tension of spring 96 to match the increased turning moment of the berth. Plate 94 and block 95 can be rotated about shaft 83 to vary the tension of spring 96 and thus adjust the counterbalancing action as well understood in the art. Said plate has formed thereon two arcuate slots 97 through which bolts 98 pass for locking said plate in adjusted position (Fig. 7).

The open side of arm 82 faces the berth pan end plate 69 which has a roller 84 journaled on the outer side thereof, for movement along and in rolling engagement with said channel, as shown in Figs. 12, 13, 16 and 18. A comparison of Figs. 11 and 12 disclose that as the berth is swung from a folded to an extended position of use, roller 84 moves outwardly along arm 82. The latching mechanism for holding the berth in extended positions of use depends upon and utilizes the above relative movement as will hereinafter be described.

Figure 19:
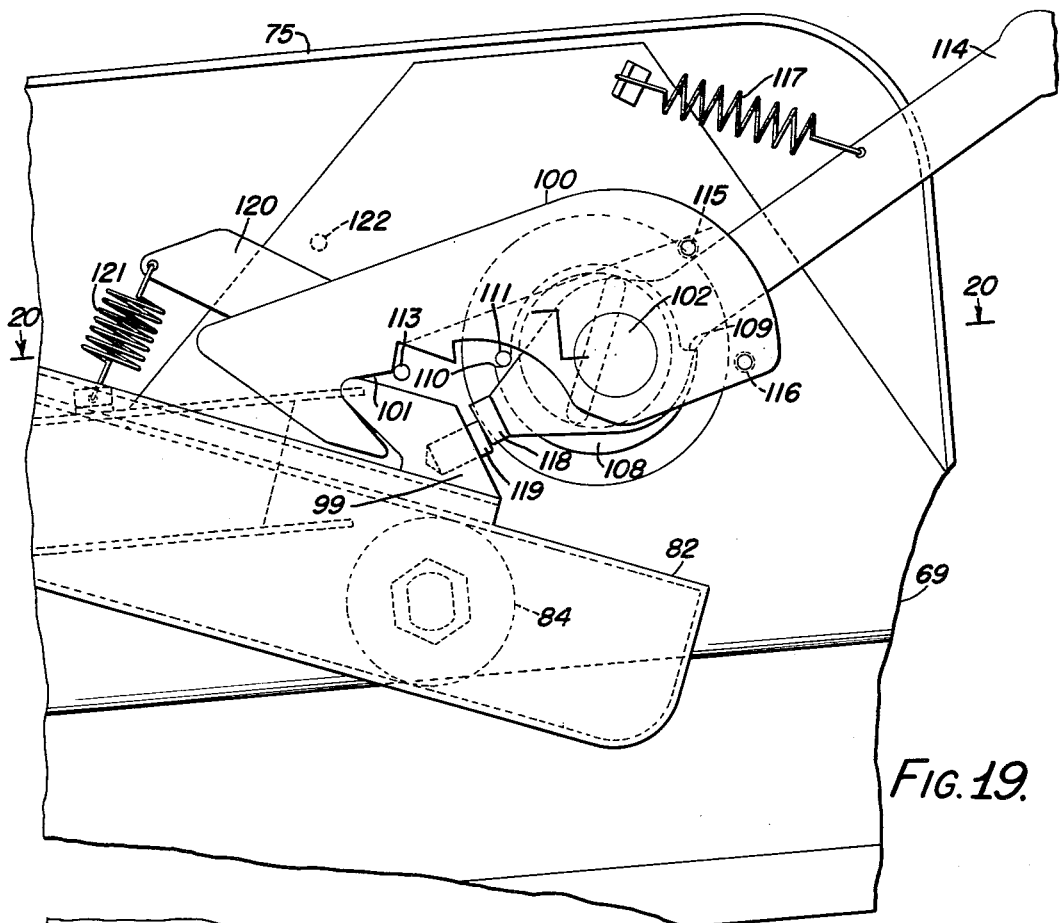
Fig. 19 is an enlarged fragmentary view of the berth latching means as shown in Fig. 13.
Figure 21:
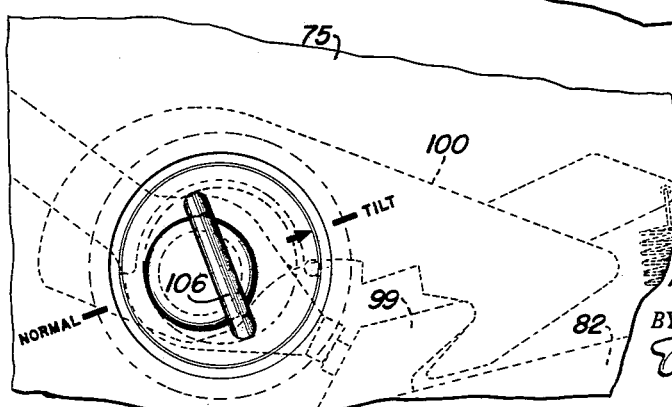
Fig. 21 is a view similar to Fig. 19, showing the opposite side of the latching means as seen from the foot of the bunk locking towards the bulkhead end as shown generally by 48 in Fig. 4.

The latching mechanism (Figs. 11 and 16–21) comprises preferably an abutment or catch 99 mounted on arm 82 adjacent the outer or free end thereof, a latch lever 100 pivotally mounted on the corresponding end of the berth pan adjacent the outer end thereof and having a notch or latch 101 adjacent one end thereof for engagement with said catch, and a means for adjusting the position of the latching lever on the berth pan so as to change the position of the berth when said lever engages said catch 99. Generally speaking the latch lever and its cooperating mounting means are adapted, in one position, to engage the catch when the berth is extended to substantially horizontal position (Figs. 12 and 16) and, upon adjustment of the latch lever outwardly on the berth pan, to engage the catch before the berth reaches the above horizontal position, so that the berth may be locked in position with its outer side somewhat elevated (Figs. 13 and 19). This provides a second extended position of use in which the berth is tilted or inclined upwardly, so as to prevent the occupant from being thrown off the berth during excessive movement of the compartment such as that caused by the swaying of a railroad car or by the rolling of a ship in a heavy sea. The upper berth is also provided with stop means hereafter described whereby the berth may be swung to a position in which the outer edge of the berth is below horizontal and thus the berth is tilted downwardly at the outer edge thereof so as to provide easier access to the berth for arranging of the bedding and the like, as shown in Fig. 14.

Figure 17:
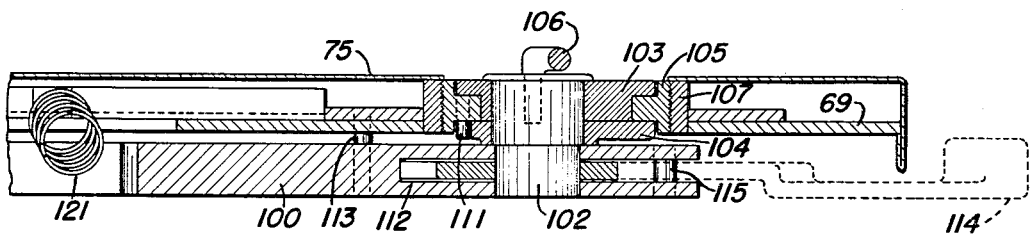
Fig. 17 is a sectional view substantially on line 17—17 in Fig. 16, partly in section, showing the eccentric mounting means for the latch.
Figure 20:
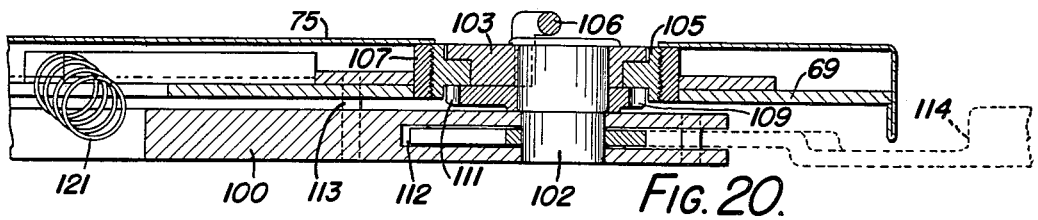
Fig. 20 is a sectional view similar to Fig. 17 substantially along line 20—20 in Fig. 19, but showing the latch eccentric mounting means in the position opposite that shown in Fig. 17.

The latching means comprises the latch lever 100 which is pivotally mounted on a short shaft or trunnion 102 which in turn is mounted on an eccentric means fastened to the end of the berth. The eccentric means comprises a two-piece eccentric disk having an inner section 103 and an outer section 104 which are mounted on a bearing ring 105 for limited pivotal movement. A handle 106 (Fig. 17) is attached to inner disk 103 for rotating the eccentric in opposite directions to change the position of the latch lever and thereby change the latched position of the berth as set forth above. Said bearing ring is threadedly secured to a sleeve 107 which is mounted in the end of the berth as shown in Figs. 17 and 20. Said eccentric disk is formed in two sections so as to allow it to be easily removed when replacement is necessary. Outer section 104 has formed thereon a raised portion or flange 108 extending substantially for 180° around said section and forming at each end thereof shoulders 109 and 110. Bearing ring 105 has a short pin 111 attached thereto adjacent outer eccentric section 104 and adapted to strike against shoulders 109 and 110 when said eccentric is rotatably adjusted in opposite directions.

Figures 16, 18:
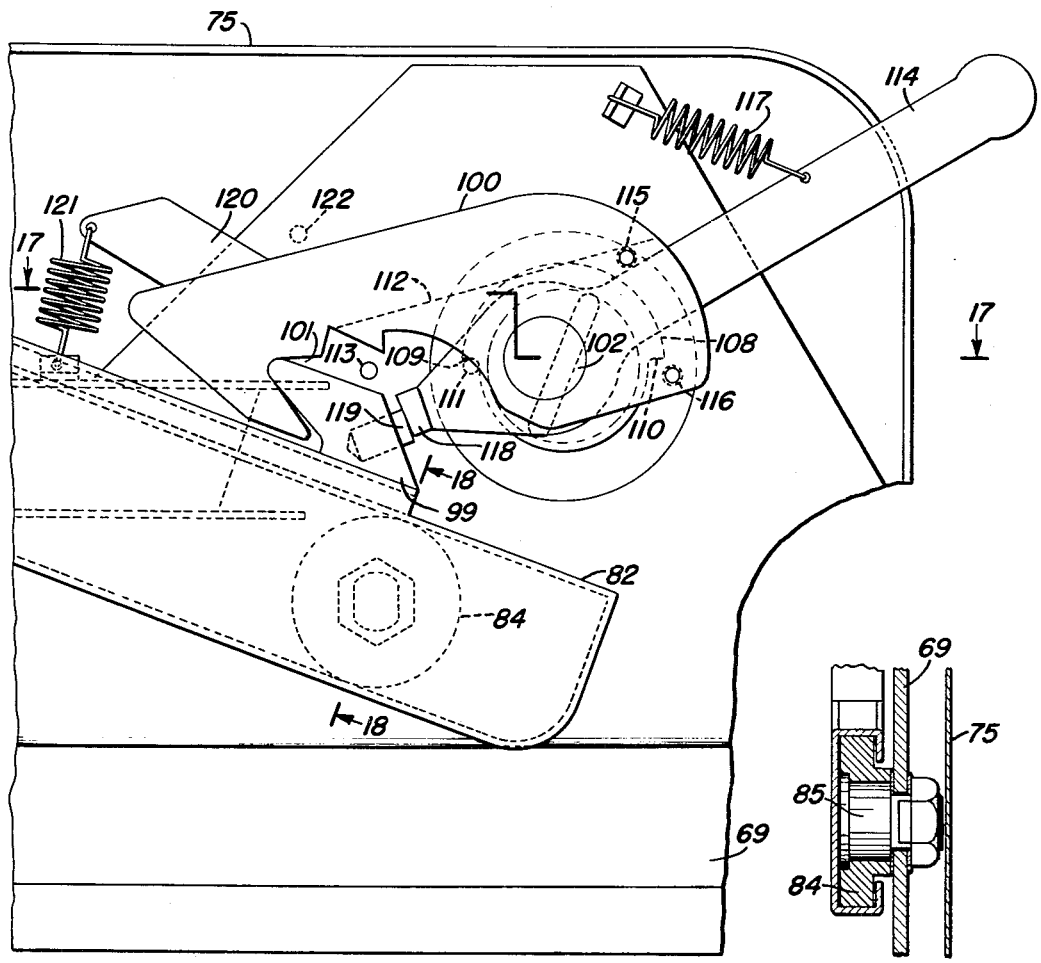
Fig. 16 is an enlarged fragmentary view of the berth latching means as shown in Fig. 12.
Fig. 18 is a sectional view substantially on line 18—18 in Fig. 16, partly in section, showing the berth supporting roller means.

Referring now to Figs. 12, 16 and 17, which show the berth extended to the horizontal position thereof, it will be seen that the eccentric disk is in its extreme counterclockwise position as seen in Fig. 16 at which point shoulder 109 strikes against pin 111, and latch lever 100 is in its innermost position along the end of the berth pan. Referring now to Figs. 13, 19 and 20, it will be seen that the eccentric disk has been adjusted in a clockwise direction as seen in Fig. 19 to its second position where shoulder 110 strikes against pin 111; this adjustment having positioned latch lever 100 outwardly on the end of said berth pan. In this position, it will be seen that latch lever 100 engages catch 99 at an earlier point in the berth's pivotal movement from a folded position to an extended position, so that in this stance the berth is latched with its outer side elevated as shown in Figs. 13 and 19.

Lever 100 has at its right hand end (Figs. 16 and 17) an inwardly extending notch or recess 112, the inner edge of which is substantially midway between the center line of shaft 102 about which said lever is pivotally mounted and notch 101 (Figs. 16 and 17). An operating handle 114 for lifting said latch lever out of engagement with catch 99 extends inwardly of said recess and is pivotally mounted on shaft 102. The pivotal movement of handle 114 is restricted by pins 115 and 116 (Fig. 16) which bridge recess 112 formed in lever 100. Handle 114 is held by spring 117 against pin 115 and has at the opposite end thereof a wedge-shaped bearing surface 118 adapted to engage an adjustable stop or bearing pin 119 secured to catch 99, as shown in Figs. 16 and 19, for holding catch 99 in engagement with latch lever notch 101. Lever 100 has formed therein an extension 120 which is connected by a spring 121 to berth end plate 69 for positioning said latch lever in the path of catch 99 as the berth is swung from a folded to an extended position of use. Pin 113 attached to the end of the berth pan limits the counterclockwise movement of latch lever 100.

To release the berth for movement to a folded position it is only necessary to depress handle 114 to the point at which bearing surfaces 118 and 119 become disengaged. Thereafter, the berth can be easily swung upwardly by hand to the folded position. With bearing surfaces 118 and 119 out of engagement, as above, the berth can be raised upwardly a few inches allowing latch lever 100 to move out of engagement with catch 99. Thereafter, the eccentric disk can be rotated by handle 106 to adjust the latching mechanism for supporting the berth in a second position, as pointed out above, or in the case of the upper berth only, handle 114 can be further depressed so as to engage pin 116 and move latch lever 100 clockwise against the tension of spring 121. While handle 114 is in the above fully depressed position, the upper berth can be swung downwardly and as lever 100 will not pass over catch 99, failing to engage the same, the pivotal movement of the berth will continue until the berth is inclined outwardly and downwardly as shown in Fig. 14.

As the lower berth bedding is easily accessible when the berth is in either of the two extended positions of use, it is not necessary to provide means whereby this berth can be swung downwardly and outwardly to a third extended position below the horizontal, as in the case of the upper berth. Therefore, under all circumstances the lower berth latching mechanism must remain operative to limit the pivotal movement of the lower berth. This is accomplished by a stop pin 122, shown by broken lines in Figs. 16 and 19, which limits the clockwise movement of handle 114 and lever 100 so that whenever the lower berth is swung to an extended position of use, lever 100 engages catch 99 thereby limiting the pivotal movement of the berth.

When the upper berth is in the above downwardly inclined position the above latching mechanism is inoperative and the berth's pivotal movement is limited by the engagement of a stop block 123 (Fig. 14) fixed to the berth head plate with stop block 124 which is secured to the adjacent inner wall 58 of the casing, as shown in Fig. 14. The upper berth has a second stop block 125 (Fig. 11) attached thereto adapted for engaging a second stop block 126 attached to end wall 58 for arresting the pivotal movement of said berth in a counterclockwise direction as the berth is moved to a folded position as shown in Fig. 11.

The lower berth has attached to the opposite or foot end thereof stop blocks 127 and 128 (Fig. 10) adapted for engagement with opposing faces of a stop block 129 which is fastened to inner casing wall 57, for arresting the pivotal movement of said berth in the folded and substantially horizontal, extended position of use, respectively.

Lower front casing wall 54 is recessed inwardly adjacent the right end thereof, as shown generally at 130 (Fig. 23) to provide operating room for foot actuated pedals 131 and 132 which control the mechanism for latching the berths in the folded positions. Pedals 131 and 132 are formed with bearings 133 for mounting said pedals on a horizontally extending shaft 134 fixed on the casing. Coiled tension springs, as 135, normally hold the inner ends of pedals 131 and 132 against rubber stop means 136 which limit the counterclockwise movement of the pedals (Figs. 22 and 24). Rubber stops 137 restrict the clockwise movement of the pedals. The berth latching mechanism comprises an adjustable stop block 138 secured to the foot end of each berth pan, which when the upper and lower berths are in the folded positions are in engagement with a pair of spring actuated latching or locking levers 139 and 140, respectively, and an operating mechanism by which these latching levers may be moved out of engagement with said stop blocks to thereby release the berths for pivotal movement to extended positions of use.

Pedal 131, which controls the latching mechanism for the lower berth, has the inner portion thereof formed with an extension 141 (Fig. 23) extending substantially transversely to the longitudinal axis of the pedal for engagement with the opening in a C-shaped bearing block 142 which is secured to the lower end of a release rod or bar shown generally at 143 (Fig. 22). Release bar 143 when actuated by pedal 131, is adapted to move locking lever 140 against the action of a coil spring 144 in a clockwise direction out of engagement with stop block 138 thereby releasing the lower berth for pivotal movement to an extended position of use.

Release bar 143 preferably comprises a rectangular body portion 145, adapted to slide vertically in a C-shaped guide 146, as shown in Figs. 23 and 24, and a rib or element portion 147 secured to the rectangular portion 145 and which projects outwardly through the open side of guide 146, towards the adjacent end of the berth, as shown in Figs. 22 and 23. Rib or element 147 extends upwardly beyond the upper end of portion 145 and has formed on the right hand side thereof, as seen in Figs. 22 and 24, a recess 148. Recess 148 extends downwardly from the upper end of rib 147 for substantially one-half the length of the rib, forming at the lower end thereof a shoulder 149 as shown in Figs. 22 and 24.

Locking lever 140 is pivotally mounted on end wall 57 of the casing adjacent guide 146 and has on the front or right hand end thereof as seen in Figs. 22 and 24, an inclined or tapered bearing surface 150 for engagement with stop block 138. Lever 140 has at the opposite end thereof a roller 151 which is adapted to extend partially into recess 148 of the release bar rib 147 and which will be struck by shoulder 149 as said release bar is raised. Thus it will be seen that when pedal 131 is depressed (Fig. 22), release bar 143 moves upwardly, shoulder 149 strikes against roller 151 and moves locking lever 140 in a clockwise direction out of engagement with stop block 138 and releases the berth for pivotal movement to an extended position of use. As release bar 143 moves upwardly, it also, by means which will be hereafter described, moves the berth from its latched position as seen in Fig. 24 through a limited angle to a partially extended position as seen in Fig. 22, at which point the latching means remains in the released position and the berth may be easily grasped for further pivotal movement by hand. The berth is prevented from swinging to its fully-extended position of use under the effect of gravity by the tension of counterbalancing spring 96. Thus, the berth will not accidentally fall to its extended position of use, but, rather, it must be first unlatched and then pulled downwardly against the action of counterbalancing spring 96.

The latching mechanism for the upper berth is similar to that described above and comprises locking lever 139 (Fig. 22) which is pivotally mounted on end wall 57 and has at the right end thereof a bearing surface 152 for engagement with stop block 138 mounted on the foot end of the upper berth. Lever 139 is provided at its other end with a roller 153. A spring 154 moves said lever in a counterclockwise direction and thus releasably holds lever 139 in position for engagement with stop block 138 to latch the upper berth in the folded position. Pedal 132 has formed at the inner end thereof a transversely extending portion 155 (Fig. 23) which engages the opening in a C-shaped bearing block 156 attached to the lower end of a T-shaped operating rod or bar 157 which is arranged for vertical sliding movement in a channel-shaped guide 158 (Fig. 31). Rod 157 has formed adjacent the upper end thereof a rearwardly projecting lug 159 which engages a notch in rod 160 which is adapted for vertical movement in channel-shaped guide 146 (Figs. 22 and 31). Rod 160 has securely attached to the upper end thereof a hollow channel-shaped member 161 (Fig. 26) which extends upwardly in guide means 146 (Fig. 29) to a point somewhat below the pivotal center of locking lever 139.

Channel 161 has attached to the upper end thereof a release bar or element 162 (Fig. 22) which has an inwardly recessed notch 163 (Fig. 24) formed therein. Notch 163 is so positioned on bar or element 162 so that when the upper berth is in its folded position and the upper berth latching mechanism is in its normal position, as shown in Fig. 22, notch 163 substantially coincides with a fixed notch 164 which is formed in guide 146 and which may best be seen when notch 163 is moved upwardly out of alignment therewith as in Fig. 24. Notches 163 and 164, when in their aligned position (Fig. 22), are adapted to receive roller 153 and allow locking lever 139 to move counterclockwise to strike against the upper berth stop block 138 for arresting the pivotal movement of the berth as shown in Fig. 22. The lower end of notch 163 forms a shoulder 165 which, when the release bar moves upwardly as shown in Fig. 24, strikes against roller 153 and moves said roller and locking lever 139 in a clockwise direction to release the upper berth. Release bar 162 is moved upwardly either by the actuation of pedal 132 through the linkage described above, or by auxiliary means to be hereinafter described.

Release bar 162, in a manner similar to release bar 143, to be hereafter described, moves the upper berth from a latched position as shown in Fig. 22 through a limited pivotal movement to a partially open position as shown in Fig. 24. Rollers 153 and 151 are adapted to freely move out of engagement with notches 163, 164 and recess 148 against the tension of springs 154 and 144 as the upper and lower berths, respectively, are moved to a folded position, during which movement stop blocks 138 slide along the upper surfaces of locking levers 139 and 140, respectively, and move said levers in a clockwise direction, as shown by the lower berth in Fig. 22. Continued movement of the berths to a folded position moves stop blocks 138 out of contact with the upper surface of locking levers 139 and 140 which thereupon snap upwardly and bring bearing surfaces 152 and 150 into contact with stop blocks 138 to latch the upper and lower berths, respectively, in the folded position.

In instances where the lower berth is in an extended position of use and the upper berth is latched in a folded position, it is evident that to release the upper berth by means of pedal 132 for movement to an extended position of use, it would be necessary to first raise the lower berth so as to permit access to pedal 132. To obviate this procedure, an auxiliary upper berth releasing mechanism is provided which can be easily operated by hand when the lower berth is in an extended position of use.

This auxiliary release mechanism comprises a handle 166 pivotally mounted on a bracket 167 secured to inner end wall 57 adjacent the rear of the lower berth opening as shown in Fig. 3. When handle 166 is moved from its normal position, as shown by full lines, to its operating position as shown by broken lines in Fig. 25, it moves channel 161 and release bar 162 upwardly, thereby moving latching lever 139 in a clockwise direction to release the upper berth for pivotal movement to an extended position of use in the same manner as when the channel is moved upwardly by the depression of pedal 132.

Handle 166 has attached thereto a cable 168 (Fig. 25) which extends downwardly within movable channel 161 (Fig. 26). The lower end of cable 168 passes through a plate 169 (Fig. 28) having a restricted opening in the center thereof and is fastened to a U-shaped bracket or clamp 170 (Fig. 26) the lower end of which is attached to a coil spring 171. The opposite or lower end of spring 171 is fixed relative to end wall 57 of the casing and guide 146, by means to be hereafter described. Plate 169 is securely fastened to movable channel 161 and is designed to allow cable 168 to freely pass through but to prevent the upward movement of clamp 170 and coil spring 171 relative to said movable channel. The opening of C-shaped channel 161 is closed by a fixed bar 172 (Figs. 26 and 30) which extends downwardly from handle bracket 167 to a point substantially adjacent the midpoint of movable channel 161. The lower end of bar 172 is secured to reinforcing channels 173 and 174 (Fig. 30) by a screw 175 which passes through a slot or opening 176 (Fig. 26) formed in channel 161 adjacent screw 175. Slot 175 extends for a predetermined distance above and below screw 175 when channel 161 and the upper berth latching mechanism are in the normal position as shown in Fig. 26. Screw 175 is fixed relative to guide 146 and end wall 57 and, upon engagement by lower end 177 of slot 176, limits the upward movement of channel 161 and release bar 162. Slot 176 is, however, of sufficient extent in the downward direction so as to permit channel 161 to move vertically to release the upper berth for pivotal movement to an extended position of use in response to the actuation of either pedal 132 or handle 166.

From the above description it is evident that in instances when the lower berth is extended preventing access to pedal 132, the upper berth may be unlatched by merely pulling handle 166 towards the front of the berth, moving it from its normal position as shown by solid lines to the position as shown by broken lines in Fig. 25, which movement pulls cable 168 upwardly through plate 169 until clamp 170 strikes against the underside of said plate at which point further movement of handle 166 moves said cable, clamp and movable channel 161 upwardly in the same manner as the channel is moved upwardly when pedal 132 is depressed. This upward movement is transmitted to release bar 162 which releases the upper berth latching mechanism as described above.

Cable 168, clamp 170 and operating handle 166 are returned to their normal positions by the action of coil spring 171, the upper end of which is secured to, and moved upwardly by, cable 168, the lower end of said spring 171 being attached to a short pin 178 (Fig. 29) which is fixed relative to guide 146. Pin 178, secured to bar 172 above screw 175, extends through the open side of guide 146 and into the open side of movable channel 161. Thus, the upward movement of cable 168 distends said spring and increases the tension within the spring 171 which, upon the release of handle 166, moves said handle and associated parts to their normal position as shown in Fig. 27.

Each berth is also provided, preferably along its inner side, with means for preventing articles from falling between the berth and the rear wall of the casing, comprising a flexible sheet metal apron 179 and 180 (Figs. 3 and 24) attached at one side thereof to the upper inner edge of the upper and lower berth pans, respectively. Aprons 179 and 180 have at the opposite sides thereof longitudinally extending rods adapted for sliding engagement with channel-shaped guides secured to the opposite inner ends of the casing. The details of construction of said rods, which may be provided at the opposite ends thereof with spring actuated plungers, form no part of the present invention and reference is made to our copending application, Serial No. 21,048, filed April 14, 1948, now Patent No. 2,652,572, granted September 22, 1953, for a full disclosure of said construction.

The rod which is attached to the lower berth apron 180, has at the right and left ends thereof, as viewed in Fig. 3, a plunger 184 (Fig. 24) and a plunger 185 (Fig. 10), respectively. Plunger 184 is adapted for vertical movement in a C-shaped guide 186 which is secured to guide 146 as shown in Fig. 31. As the lower berth moves from a folded position to an extended position of use, as shown by full and broken lines, respectively (Fig. 6), plunger 184 moves upwardly along channel 186 from its lower position to its upper position as shown in Fig. 6 by full and broken lines, respectively. Plunger 185 at the opposite end of apron 180 moves upwardly through a corresponding distance along a channel-shaped guide (not shown), similar to guide 186, which is secured to the inner wall 58 of the opposite end casing. The initial upward movement of plungers 184 and 185 and the initial opening movement of the lower berth from a folded position, as shown in Fig. 24, to a partially extended position, as shown in Fig. 22, is caused by the upper end of release bar rib section 147 engaging and moving upwardly plunger 184 (Fig. 22) as release bar 143 moves upwardly in response to the actuation of pedal 131.

The rod which is secured to the upper berth apron 179 is similar to the lower berth rod and has at the right and left ends thereof, as viewed in Fig. 3, a plunger 187 (Fig. 22) and a plunger 188 (Fig. 11), respectively. Plunger 187 is adapted for vertical movement along guide 146 from its lower position to its upper position, as shown in Fig. 5 by full and broken lines, respectively, as the upper berth is moved from a folded position to an extended position of use, as shown in Fig. 5 by full and broken lines, respectively. Plunger 188 at the opposite end of said apron 179, moves upwardly through a corresponding distance along an extension of the channel-shaped guide (not shown) of the corresponding lower berth plunger 185. The initial upward movement of plungers 187 and 188 and the initial opening movement of the lower berth from a folded position, as shown in Fig. 22, to a partially extended position, as shown in Fig. 24, is caused by the upper end of release bar 162 engaging and moving upwardly plunger 187 (Fig. 24) as said release bar moves upwardly in response to the actuation of either pedal 132 or handle 166.

The upper berth is preferably protected by guard or lee rail means adapted to be partially collapsed when the berth is moved to a folded position. Such means comprise posts 189 and 190 (Figs. 3 and 14) fixed on and extending upwardly from the outer side of the berth pan at the head and foot ends thereof, respectively. The posts have at the outer ends thereof bearings for pivotally supporting a longitudinally extending tubular member 191 (Fig. 3). The guard rail comprises a body section 192 and a foot section 193 spaced along and secured to said tubular member as shown in Fig. 3, leaving a space therebetween through which access may be had to or from the berth by means of a ladder 194 shown by broken lines in Figs. 3 and 4.

A short link 195 (Figs. 5 and 14) is mounted for pivotal movement on bearing post 190 as shown in Figs. 3, 4 and 14. An elongated link 196 and a catch lever 197 (Fig. 14) are pivotally attached to the opposite end of link 195. The opposite end of elongated link 196 is in turn pivotally attached to a triangular-shaped link 198 which is secured to the upper inner corner of the berth pan and to apron plunger 187 as shown in Figs. 13 and 14. When the upper berth is in the extended position as shown in Figs. 3 and 4, guard rail sections 192 and 193 are normally locked in the upright position but they can easily be released for limited pivotal movement in a clockwise direction, as shown in Fig. 14, by operating catch 197 which has a U-shaped slot 199 adapted to releasably engage a stud 201 (Fig. 14) on the outer upper end of guard rail section 193 as shown in Figs. 4 and 5. As guard rail sections 192 and 193 are both secured to tubular member 191 said sections move as a unit so that only a single catch is required.

Referring to Fig. 5, the positions of the guard rail and actuating links are shown in full and broken lines for the folded and extended positions of the berth, respectively. As the berth is lowered to the extended position of use, plunger 187 and link 198 move upwardly along channel 146, and raise the guard rail as shown. Figs. 13 and 14 indicate the relative positions of links 196 and 198 and the guard rail sections 192 and 193 when the berth is extended to the upwardly elevated position and the downwardly tilted position, respectively. Catch 197 may be released, as in Fig. 14, to allow the guard rail to swing outwardly and downwardly in any of the extended positions of the berth for access to the bed.

The lower berth is provided with a guard rail section 202 (Figs. 3, 4 and 10) which is rigidly secured to the front side of the berth pan by suitable means (not shown). The lower berth may also be provided with a mattress hold-down of any suitable construction, as well known in the art.

It has been found desirable to pivot the upper and lower berths at relatively low elevations in the casing, to conserve space and position them conveniently for access in use. However, it has also been found desirable to maintain the bottom of the upper berth at a sufficient elevation above the lower berth to insure head room for the occupants of the latter, as well as to maintain similar head room between the upper berth and the top of the casing. It has been found desirable, also, in the closed positions of the berths, to provide ample clearance between the top of the upper berth and the top of the casing and between the top of the lower berth and the bottom of the upper berth to afford ample clearance for any articles which may project above the berth pans. Furthermore, the berths are of limited width and such basic space requirements, in order to provide a continuous wall when the berth is closed, and a convenient and comfortable berth when it is open, have been a problem which has been solved by the provision of movable closure flaps or plates 203 and 204 (Fig. 1) by means of which ample clearances are obtained, while the gaps left between the berths and the tops of their casing openings are effectively closed. By this means, the berths are completely enclosed in the casing and the parts together maintain a neat and pleasing continuity of wall surface.

In the case of the lower berth, this supplemental closure panel is provided in the form of a flap 203 (Fig. 6) hinged along its bottom edge 205 to the lower outer corner 206 of the berth pan. Plate 203 has pivoted to the right hand end thereof (as viewed in Fig. 3) a long link 207 (Fig. 6) which has its other end pivotally connected to a short, substantially L-shaped link 208. Link 208 is pivotally connected to the berth pan above the pivotal axis of the pan and has an arm 209 adapted to engage an adjustable bearing block 210 fixed on end wall 57, when said berth moves from an extended to a folded position. As the berth is swung counterclockwise to a folded position as shown by full lines in Fig. 6, arm 209 engages bearing block 210 and is rotated counterclockwise, moving link 208 outwardly along the berth. This movement of link 208 swings plate 203 outwardly, as the berth is raised, until it lies in line with the bottom of the berth pan, as shown, thus forming, in effect, a closure plate completely closing the berth receiving opening in the wall of the berth.

Plate 203, at its other end, has a pivotal connection with the outer end of a plunger 211 (Fig. 10) sliding telescopically through one end of a cylinder 212 the other end of which is pivotally connected with the berth. The cylinder contains a coiled spring between its outer end and the end of the plunger which is compressed as the plate 203 is moved to close the berth opening by the above described linkage. This spring serves to retract the plate against the outer side of the berth pan as the latter is moved to an extended position of use.

The upper berth is also provided with a closure panel in the form of a plate or flap 204 (Fig. 5) having attached to its back, adjacent the ends thereof, brackets 213 which are pivotally mounted by suitable means on inner end walls 57 and 58. The brackets have attached thereto Z-shaped levers 214 the upper ends of which are fastened to coil springs 215 having their upper ends secured to rear casing wall 216. When the berth moves to an extended position, springs 215 which are under tension, move plate 204 in a counterclockwise direction to the position as shown by broken lines in Fig. 5. The opposite ends of levers 214 are formed for engagement with the outer edge of the berth pan as the berth is moved to a folded position, which movement swings levers 214 and plate 204 in a clockwise direction to the position as shown by solid lines in Fig. 5 in which position said plate completely closes the berth receiving opening in the wall of the equipment.

The operation of the equipment is evident from the above description. In folded position, the berths and their supporting structure and operating mechanism are fully and compactly enclosed in a casing which forms, in effect, a portion of the side walls of the compartment. In use, each counterbalanced berth may be readily lowered, with a minimum of effort, by first depressing the respective release pedal and then pulling the berth outwardly and downwardly until the berth automatically locks in the desired extended position of use substantially horizontal or inclined upwardly for use in rough weather. In such opening movement, the supplemental casing panels 203 and 204 are automatically retracted and disposed in out-of-the-way positions and the guard rail means on the upper berth is automatically raised. The inner side of each berth is safeguarded in all positions by an apron to prevent bedding or other articles from dropping or becoming wedged between the side of the berth and the rear wall of the casing.

With the berth locked in an extended position of use, it is a simple matter, to depress the operating handle 114 thereby releasing the locking device after which the berth may be easily swung upwardly and inwardly to the folded position, or with the locking device in the above disengaged position the eccentric handle 106 may be rotated so that the berth can be relocked in a position inclined somewhat upwardly to safeguard the occupant from rolling out. The upper berth has, in addition to the above extended positions of use, a third extended position which is reached by merely depressing operating handle 114, raising the berth slightly, and then pulling the berth downwardly with the operating handle fully depressed until its pivotal movement is arrested by suitable stop means. Each berth is provided with a pedal for releasing the berth from the folded position, and the upper berth has in addition a supplementary release lever 166, located in the rear of the lower berth opening, which is easily operated when the lower berth is in an extended position of use which prevents access to the pedal release.

The advantageous berth arrangements are adapted for convenient operation by the occupant or passenger himself, so as to obviate the necessity for operation by skilled attendants, and the berths are effectively counterbalanced at all times and securely locked in either of the extended positions of use, so as safeguard the occupant against unintended movement or rolling of the ship or railway car in which the berths are employed.

It will thus be seen that the invention accomplishes its objects and while it has been herein disclosed by reference to the details of a preferred embodiment, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

We claim:

1. In a folding berth, a supporting and enclosing casing formed with a berth receiving opening, a berth movably supported by said casing for movement between a folded position in said opening and a position of use outside said casing, mechanism for movably supporting said berth comprising a supporting arm having a pivotal connection with said casing, a device on said berth provided with means for longitudinal movement along said supporting arm, and a latch means for releasably locking said device relative to said arm for securing said berth in said position of use.

2. In a folding berth, a supporting means, a berth movably connected with said means for movement between a folded position thereon and an extended position of use, mechanism for movably supporting said berth comprising a supporting arm pivotally attached to said means, a device on said berth provided with means for longitudinal movement along said supporting arm, spring means for counterbalancing the weight of said berth, and a latch means for releasably locking said device relative to said arm for securing said berth in said position of use.

3. In a folding berth, a supporting means, a berth movably connected with said means for movement between a folded position thereon and an extended position of use, mechanism for movably supporting said berth comprising a supporting arm pivotally attached at one end thereof to said means, a catch mounted adjacent the opposite end of said supporting arm, a member on said berth for movement longitudinally along said supporting arm, and a latch means on said berth positioned to releasably engage said catch in the extended position of the berth for locking said member relative to said arm for securing said berth in said extended position of use.

4. In a folding berth, a supporting means, a berth movably connected with said means for pivotal movement between a folded position thereon and an extended position of use, said berth having its opposite ends pivotally mounted in said means, a supporting arm pivoted on said means eccentrically with the pivotal mounting of said berth, a member mounted on said berth for movement along said supporting arm in engagement therewith, spring means for counterbalancing the weight of said berth and arm, and a latch means for releasably locking said member to said arm for securing said berth in a predetermined position on said means.

5. In a folding berth, a supporting frame, a berth provided with trunnions at opposite ends thereof, bearings on said frame for supporting said trunnions, a trunnion mounted on said frame eccentrically with said bearings, a supporting arm pivotally mounted on said frame trunnion, a spring coiled about said frame trunnion and having one end connected to said arm and the other end adjustably connected to said frame, a member mounted on said berth for movement along said supporting arm in engagement therewith, and a latch means for releasably locking said member relative to said arm for securing said berth in a predetermined position of use.

6. In a folding berth, a supporting and enclosing casing formed with a berth receiving opening, a berth pivotally supported by said casing for movement between a folded position in said opening and a position of use outside said casing, mechanism for movably supporting said berth comprising a supporting arm having a pivotal connection with said casing, a roller on said berth for longitudinal rolling engagement with said supporting arm, and a latch means on said berth for releasably locking said berth to said arm to secure said berth in a predetermined position of use.

7. In a folding berth, a supporting casing having a berth receiving opening in a side thereof, a berth having its ends pivotally mounted in said casing for movement to a folded position and to extended positions of use, mechanism for movably supporting said berth comprising a supporting arm pivotally attached to said casing, a catch adjacent the free end of said arm, and a latching means on said berth comprising a latch lever pivotally mounted on said berth and adapted to engage said catch in a plurality of positions for arresting and releasably locking said berth in a plurality of predetermined extended positions of use.

8. In a folding berth, a supporting casing having a berth receiving opening in a side thereof, a berth having its ends pivotally mounted in said casing for movement to a folded position and to extended positions of use, mechanism for movably supporting said berth comprising a supporting arm pivotally attached to said casing, a catch adjacent the free end of said arm, a latching means on said berth comprising a latch lever having a notch adjacent one end thereof for engaging said catch and releasably locking said berth relative to said arm, and means for moving said latch lever from one position to a second position on said berth for releasably engaging said catch and locking said berth in a second extended position of use.

9. In a folding berth, a supporting casing having a berth receiving opening in a side thereof, a berth having its ends pivotally mounted in said casing for movement between a folded position and extended positions of use, mechanism for movably supporting said berth comprising a supporting arm pivotally attached to said casing, a catch adjacent the free end of said arm, a latching means comprising an eccentric disk rotatably mounted on said berth, a latch lever pivotally mounted on said disk, said lever having a notch adjacent one end thereof for releasable engagement with said catch for locking said berth in one of said extended positions of use and means for rotating said disk and moving said lever along said berth to position for releasably engaging said catch to lock said berth in a second extended position of use.

10. In a folding berth, a supporting casing having a berth receiving opening in a side thereof, a berth having its ends pivotally mounted in said casing for movement to a folded position and to an extended position of use, mechanism for movably supporting said berth comprising a supporting arm pivotally attached to said casing, a catch on said arm, a stop means on said arm, a member on said berth for movement on said supporting arm, a latching means comprising a bearing on said berth, a disk rotatably mounted in said bearing and having a shaft mounted eccentrically thereon, a handle means for rotating said disk, a lever pivotally mounted on said shaft and provided with a latch, and an operating handle pivotally mounted on said shaft for operating said latch lever and having a bearing means thereon for releasably engaging said stop means for holding said latch in engagement with said catch and locking said berth in said extended position of use.

11. In a folding berth, a supporting casing having a berth receiving opening in a side thereof, a berth movably supported in said casing for folding movement between a folded position substantially closing said opening and an extended position of use, mechanism for movably supporting said berth comprising a supporting arm pivotally attached to said casing, a device on said berth for movement on said supporting arm, latch means for releasably holding said berth in said folded position, and pedal means mounted on said casing for releasing said latch means and having an element fixed thereto for engaging and moving said berth to partially extended position concomitantly with the release of said latch means.

12. In a folding berth, a supporting casing having a berth receiving opening in a side thereof, a berth movably supported in said casing for folding movement between a folded position substantially closing said opening and an extended position of use, a latch means for releasably locking said berth in said folded position, release means mounted on said casing and engaging said latch means for releasing the same, said release means having an element fixed thereto for engaging and moving said berth to partially extended position concomitantly with the release of said locking means, and hand operated means on said casing for actuating said releasing means.

13. In a folding berth, a supporting casing having a berth receiving opening in a side thereof, a berth movably supported in said casing for folding movement between a folded position substantially closing said opening and an extended position of use, a latch means for releasably locking said berth in said folded position comprising a locking lever for releasably securing said berth relative to said casing, release means mounted on said casing engaging said lever for actuating the same for releasing said berth for movement to said extended position of use, said release means having an element fixed thereto for engaging and moving said berth to partially extended position concomitantly with the release of said locking lever, and pedal means on said casing for actuating said release means.

14. In a folding berth, a supporting casing having a berth-receiving opening in a side thereof, a berth movably supported in said casing for folding movement between a folded position substantially closing said opening and an extended position of use, latch means on said casing for releasably locking said berth in said folded position, release means mounted on said casing and engaging said latch means for releasing the same, said release means having an element fixed thereto for engaging and moving said berth to partially-extended position concomitantly with the release of said locking means, and hand operated means on said casing for actuating said release means.

15. In a folding berth, a supporting means, spaced bearings on said means, a berth pan, a rigid, one-piece, tubular member fixed to one side of said pan, a pair of rigid arms fixed to the ends of said member and to the ends of said pan, respectively, to rigidly support said pan on said member, and trunnions on said arms engaging said bearings for pivotally supporting said pan on said supporting means.

16. In a folding berth, a berth pan structure comprising a berth pan, a rigid, tubular member and spaced transversely extending rigid supporting elements fixed to the opposite ends of said tubular member and connected with the ends of said berth pan, said tubular member and spaced supporting elements having a high resistance to twisting and bending action and forming a rigid frame adapted to support said berth pan.

17. In a folding berth, a berth pan structure comprising a light weight berth pan, a rigid, one-piece, tubular side member and a pair of rigid supporting arms fixed to the ends of said side member and connected to the ends of said berth pan, said member and arms forming a frame having a high resistance to twisting and bending action and adapted to rigidly support said berth pan.

18. In a folding berth, a supporting casing having a berth receiving opening in a side thereof, a berth pan movably connected with said casing for movement between a folded position thereon partially closing said opening and an extended position of use, a closure plate hinged to the outer side of said pan, and link means connected to said plate and pan for swinging said plate during folding movement of said pan to complete the closing of said opening.

19. In a folding berth, a supporting casing having a berth receiving opening in a side thereof, a berth pan movably connected with said casing for movement between a folded position thereon partially closing said opening and an extended position of use, a closure plate hinged to the outer side of said pan, link means connected to said plate and said pan for swinging said plate during folding movement of said pan to complete the closing of said opening, and spring means connected to said pan and said plate for retracting said plate against the outer side of said pan in the extended position thereof.

20. In a folding berth, a supporting casing having a berth receiving opening in a side thereof, a berth pan movably connected with said casing for movement between a folded position thereon partially closing said opening and an extended position of use, a closure plate hinged to the outer side of said pan, link means connected to said plate and said pan, adjustable means on said casing for actuating said link means to swing said plate during folding movement of said pan to complete the closing of said opening, and spring means connected to said plate and said pan for retracting said plate against the outer side of said pan in the extended position thereof.

21. In a folding berth, a supporting casing having a berth receiving opening in a side thereof, a berth pan having its opposite ends pivotally mounted in said casing for movement to a folded position partially closing said opening and to an extended position of use, a closure plate hinged to the outer side of said pan, link means connected to said plate and to said pan eccentrically of said pivotal mounting of said pan, adjustable means on said casing for actuating said link means to swing said plate during folding movement of said pan to complete the closing of said opening, and spring means connected to said plate and said pan for retracting said plate against the outer side of said pan in the extended position thereof.

22. In a folding berth, a supporting casing having a berth receiving opening in a side thereof, a berth mounted for movement in said casing between a folded position partially closing said opening and an extended position of use, a closure plate hinged to said casing, and a lever means on said plate engaged directly by said berth for swinging said plate to position for completely closing said opening in the folded position of said berth.

23. In a folding berth, a supporting casing having a berth receiving opening in a side thereof, a berth mounted for movement in said casing between a folded position partially closing said opening and an extended position of use, a closure plate hinged to said casing, a lever means on said plate engaged directly by said berth for swinging said plate to position for completely closing said opening in the folded position of said berth, and spring means connecting said plate and said casing for moving said plate to the open position in the extended position of said berth.

24. In a folding berth, a supporting casing having a berth receiving opening in a side thereof, a berth movably supported on said casing for movement to a folded position substantially closing said opening and to an extended position of use, guard rail means movable on said berth between raised and folded positions, and link means connected with said guard rail means and with said berth and having a sliding connection with said casing for moving said rail means to raised position in the extended position of said berth.

25. In a folding berth, a supporting casing having a berth receiving opening in a side thereof, a berth having its ends pivotally mounted on said casing for movement to a folded position substantially closing said opening and to an extended position of use, guard rail means comprising an elongated member pivotally mounted on said berth, and link means pivotally connected with said elongated member and said berth and slidably connected with said casing eccentrically of said pivotal mounting of said berth for moving said rail means to raised position in the extended position of the berth.

26. In a folding berth, a supporting casing having a berth receiving opening in a side thereof, a berth pan having its ends pivotally supported in said casing for movement to a folded position closing said opening and to an extended position of use, an apron of relatively stiff material having one side edge thereof pivotally connected with the top rear wall of said pan, guide means at the opposite edge of said apron, cooperating means on said casing for guiding said opposite apron edge for sliding movement along said casing to continuously close the opening between said casing and pan wall, a latching means for releasably locking said berth in folded position, and a foot operated means for actuating and releasing said latching means and having an element fixed thereto for concomitantly moving said guide means along said cooperating means to move said berth to a partially extended position.

References Cited in the file of this patent

UNITED STATES PATENTS

| | | |
|---|---|---|
| 484,722 | Penney | Oct. 18, 1892 |
| 504,778 | Flory | Sept. 12, 1893 |
| 562,269 | Auerbach | June 16, 1896 |
| 675,702 | Adams | June 4, 1901 |
| 785,220 | Knaggs | Mar. 21, 1905 |
| 1,164,594 | Caler | Dec. 14, 1915 |
| 2,299,343 | Patton | Oct. 20, 1942 |
| 2,514,032 | Dean et al. | July 4, 1950 |
| 2,528,307 | Heaney | Oct. 31, 1950 |
| 2,541,540 | Patton | Feb. 13, 1951 |
| 2,637,856 | Woller | May 12, 1953 |
| 2,650,370 | Cuidini | Sept. 1, 1953 |

FOREIGN PATENTS

| | | |
|---|---|---|
| 16,718 | Great Britain | 1888 |